United States Patent [19]
Shinozaki

[11] Patent Number: 5,270,940
[45] Date of Patent: Dec. 14, 1993

[54] CONTOUR CONFIGURATION MACHINING METHOD

[75] Inventor: Satoru Shinozaki, Shimodate, Japan

[73] Assignee: Fanuc Ltd, Minamitsuru, Japan

[21] Appl. No.: 957,063

[22] Filed: Oct. 6, 1992

Related U.S. Application Data

[63] Continuation of Ser. No. 536,541, Jul. 10, 1990, filed as PCT/JP89/01145, Nov. 7, 1989, abandoned.

[30] Foreign Application Priority Data

Nov. 29, 1988 [JP] Japan .................................. 63-301833

[51] Int. Cl.$^5$ .................... G06F 15/46; G05B 19/18
[52] U.S. Cl. ................... 364/474.29; 318/568.1; 364/193; 364/474.25
[58] Field of Search ................... 364/474.22–474.27, 364/474.29, 191–193; 318/568.1

[56] References Cited
U.S. PATENT DOCUMENTS

| | | | |
|---|---|---|---|
| 4,445,182 | 4/1984 | Morita et al. | 364/474.25 |
| 4,587,608 | 5/1986 | Kishi et al. | 364/474.25 X |
| 4,722,045 | 1/1988 | Kishi et al. | 364/474.25 X |
| 4,723,203 | 2/1988 | Kishi et al. | 364/474.25 |
| 4,928,221 | 5/1990 | Belkhiter | 364/474.24 |

*Primary Examiner*—Joseph Ruggiero
*Attorney, Agent, or Firm*—Staas & Halsey

[57] ABSTRACT

A contour configuration machining system of an interactive numerical control apparatus is provided for carrying out a machining operation by a lathe by programming a predetermined contour configuration based on configuration data of straight lines, arcs and the like. A cutting direction (9) is independently set on a display (1) for each of the above configuration data and the machining operation is carried out by moving a tool according to the set cutting direction, whereby the machining efficiency is improved when a configuration composed of a series of contours is to be machined.

4 Claims, 3 Drawing Sheets

CONTOUR CONFIGURATION MACHINING METHOD

This application is a continuation of application Ser. No. 07/536,541, filed Jul. 10, 1990, filed as PCT/JP89/01145, Nov. 7, 1989, now abandoned.

BACKGROUND OF THE INVENTION

1. Field of the Invention

The present invention relates to a contour configuration machining system of an interactive numerical control apparatus, and more specifically, to a contour configuration machining system by which a cutting direction can be arbitrarily changed.

2. Description of the Related Art

Interactive numerical control apparatuses are widely used to control various machine tools, because an operator can easily create programs without the need for taking a language protocol, NC tape format and the like of an automatic programming into consideration.

For example, when a machining operation is carried out by a lathe, an interactive type input of configuration data by an operator enables a program to be created by automatically calculating intersect and contact points of a contour configuration and like. Interactive input can be used to produce a program for a machining operation beginning at the start point of a first configuration data and carried out along the required contour configuration.

Nevertheless, some of the tools used for a lathe produce cutting performances in accordance with the cutting directions thereof. When such a tool is used in a conventional cutting system, the machining operation is not always carried out in an optimum cutting direction of the tool for all portions of a workpiece being machined. This results when the machining operation is carried out along a configuration composed of a series of contours. As a result, the machining efficiency is lowered and the tool life is shortened.

DISCLOSURE OF THE INVENTION

Taking the above into consideration, an object of the present invention is to provide a contour configuration machining system capable of arbitrarily changing a cutting direction. To solve the above problem, according to the present invention, there is provided a contour configuration machining system of an interactive numerical control apparatus for carrying out a machining operation by a lathe by programming a predetermined contour configuration based on configuration data of straight lines, arcs and the like, the system comprising the steps of independently setting a cutting direction for each of the configuration data, and carrying out the machining operation by moving a tool according to the set cutting direction.

Accordingly, the cutting direction is independently set for each of the configuration data, the machining operation can be carried out while the tool is moved in an optimum direction at all times, even if a series of contours are machined.

DESCRIPTION OF THE PREFERRED EMBODIMENT

An embodiment of the present invention will be described below with reference to drawings.

Figure 1:
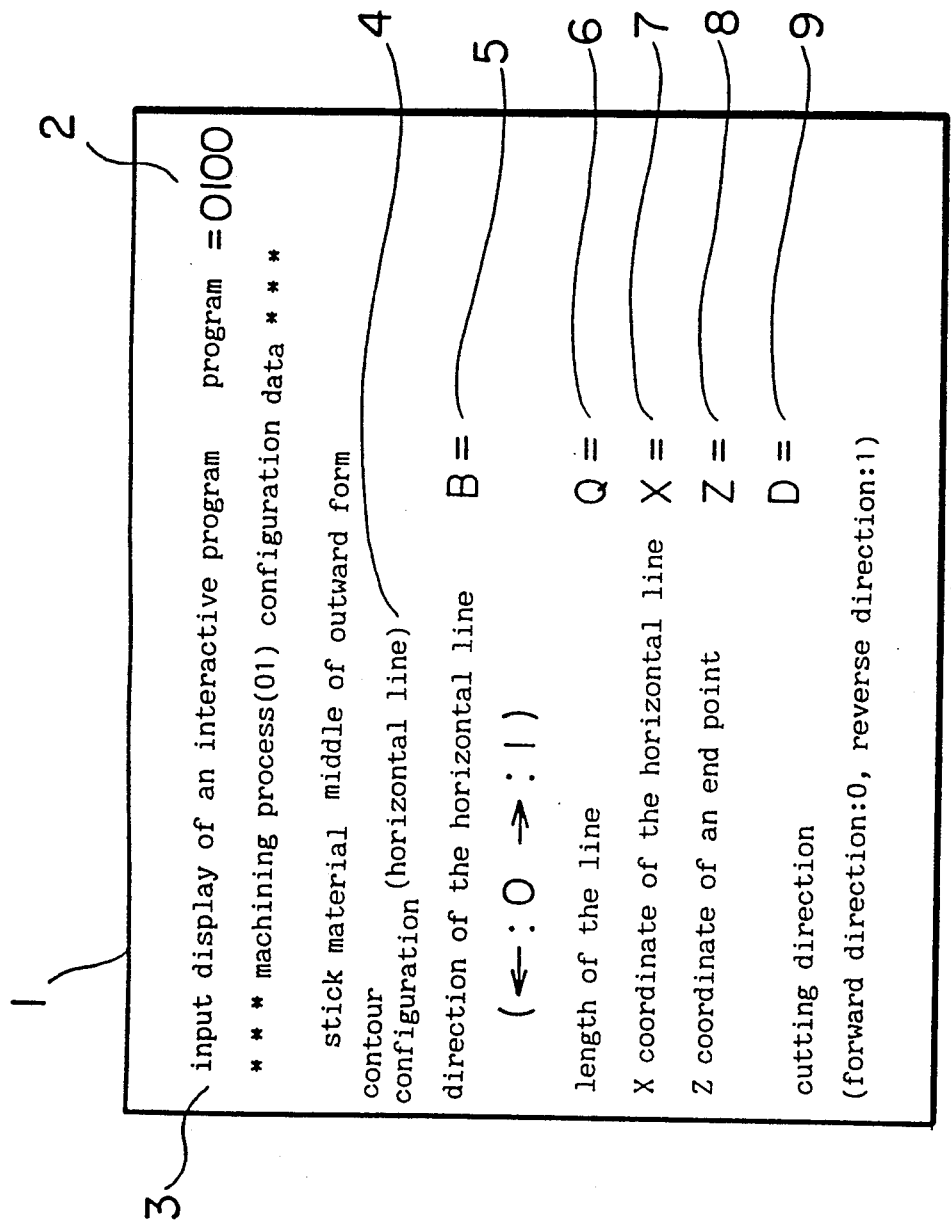
FIG. 1 is a program display of a contour configuration according to a contour configuration machining system of an embodiment of the present invention.

FIG. 1 is a display used when a machining program of a lathe is created according to a contour configuration machining system of an embodiment of the present invention, wherein 1 designates a display of an interactive numerical control apparatus on which a program number 2 and a title 3 indicate that the display is a configuration data input display. Note that the display shows the case in which a contour configuration of a horizontal line shown by numeral 4 is programmed.

In FIG. 1, 5 to 8 designate columns or fields to which configuration data is input. Namely, 5 denotes a column specifying a direction of the configuration data, in which "0" is input when the data is directed to the left from a start point and "1" is input when the data is directed to the right from the start point, 6 denotes a column to which a length of the line is input, 7 denotes a column to which an X coordinate is input, and 8 denotes a column to which a Z coordinate of an end point is input.

Designated at 9 is a column for specifying a cutting direction, wherein "0" is input when the cutting direction is forward with respect to the direction 5 of the configuration data and "1" is input when the cutting direction is reverse with respect thereto. Note that configuration data of a vertical line, an arc and the like other than above are input to respective dedicated displays, but the method of setting the cutting direction is the same as that described above, and thus these settings are based on the direction of the input configuration data. A configuration composed of a series of arbitrary contours, and a cutting direction of each section thereof, are programmed as described above.

Figure 2:
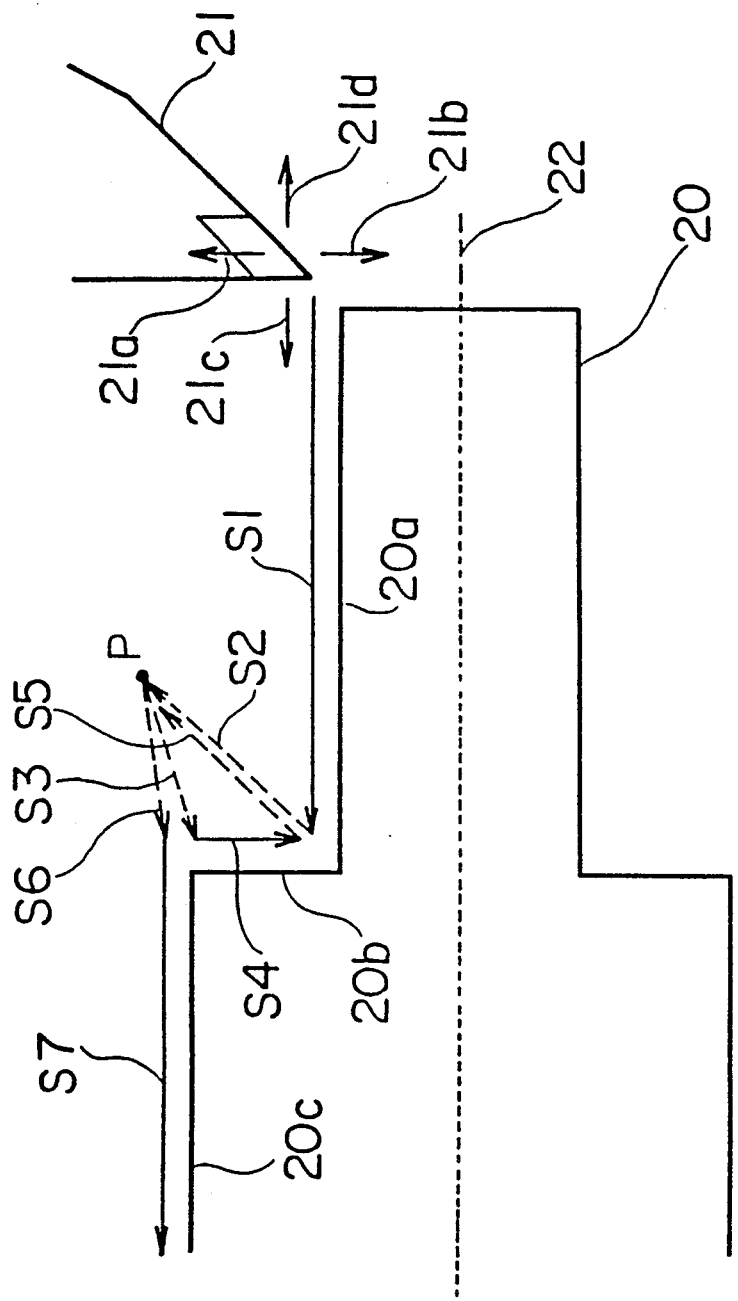
FIG. 2 is a diagram showing a movement of a tool when a machining operation is carried out according to an embodiment of the present invention.

FIG. 2 is a diagram showing a movement of a tool when machining operation is carried out, wherein 20 designates a programmed workpiece contour configuration composed of a configuration 20a, a configuration 20b and a configuration 20c, and 22 designates an axis of rotation.

Designated at 21 is the tool having a strong horizontal cutting ability in a direction 21c and a weak horizontal cutting ability in a direction 21d, and further a strong vertical cutting ability in a direction 21b and a weak vertical cutting ability in a direction 21a. Therefore, in this case the program specifies that all machining operations in a horizontal direction must be carried out in the direction 21c and all machining operations in a vertical direction must be carried out in the direction 21b.

More specifically, in a machining process S1, the configuration 20a is machined in the direction 21c.

When this machining process S1 has been completed, the lip of the tool 21 is moved to a point P by a quick feed process S2. The point P is an auxiliary point set while programming in such a manner that it does not interfere with the machining operation. The tool 21 is moved to the start point of the configuration 20b from the auxiliary point P by a quick feed process S3 and carries out a machining process S4 in the direction 21b.

Next, the lip of the tool 21 is moved again to the auxiliary point P by a quick feed process S5, then further moved to the start point of the configuration 20c therefrom by a quick feed process S6, and carries out a machining process S7 in the direction 21c. Accordingly, as described above, the machining operation can always be carried out in the optimum cutting direction of the tool 21 for any machining process.

Although the above description is made with respect to a machining operation carried out by a lathe, the present invention is applicable to any kind of machining operation other than above.

Figure 3:
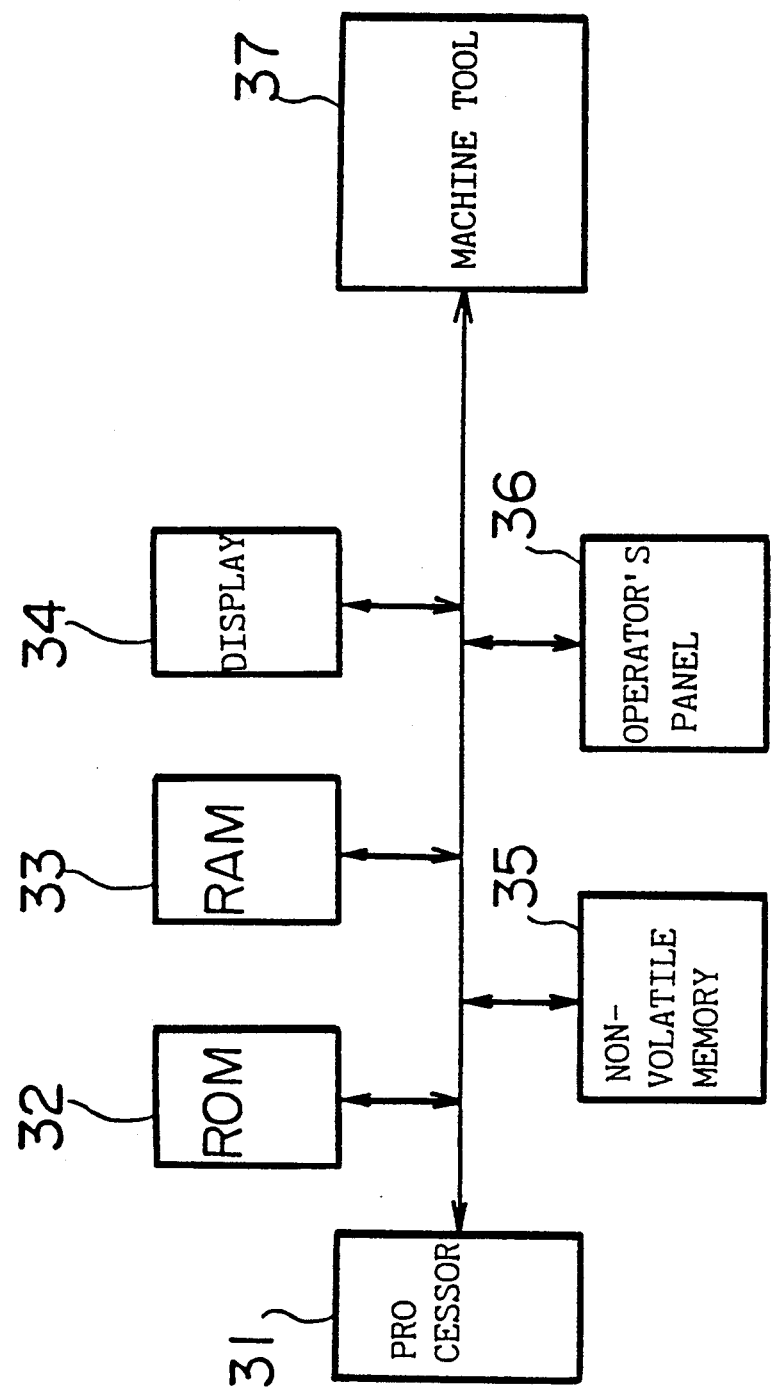
FIG. 3 is a schematic diagram of hardware of an interactive numerical control apparatus embodying the present invention.

FIG. 3 shows a schematic diagram of hardware of an interactive numerical control apparatus embodying the present invention, wherein 31 designates a processor for controlling the interactive numerical control apparatus as a whole, 32 designates a ROM in which a system program is stored, 33 designates a RAM in which various data is stored, 34 designates a display unit such as a CRT or the like for displaying input configuration data, calculated intersect points and the like, 35 designates a non-volatile memory in which various parameters, pitch error correction amounts, machining programs and the like, as well as configuration data and a cutting direction for each of the configuration data are stored, 36 designates an operator's panel such as a keyboard, and 37 designates a machine tool.

As described above, according to the present invention, when a machining program is created, a cutting direction of a tool is specified to thereby carry out the machining operation in an optimum direction inherent to a tool at all times. As a result, the machining efficiency is improved and the tool life is prolonged.

What is claimed is:

1. A contour configuration machining method of an interactive numerical control apparatus for carrying out a machining operation by a lathe by programming a predetermined contour configuration based on configuration data of straight lines, arcs and other data, comprising the steps of:
   (a) storing with each of said configuration data optimally efficient tool cutting direction information for a tool associated with said configuration data; and
   (b) carrying out the machining operation by moving the tool according to the optimally efficient tool cutting direction information stored with each of said configuration data.

2. A contour configuration machining method according to claim 1, wherein the optimally efficient tool cutting direction information indicates one of a forward direction and a reverse direction with respect to a direction from a start point to an end point of said configuration data.

3. A contour configuration machining method according to claim 1, wherein said machining operation is carried out by a machining process divided into sub-processes each based on one of said configuration data.

4. A contour configuration machining method according to claim 1, wherein step (b) comprises, when a coordinate at a point at which a machining process has been completed does not coincide with a coordinate of a start point for machining of a next machining process according to the optimally efficient tool cutting direction information, performing a quick feed of said tool to a predetermined auxiliary point and then said tool is moved to said start point of said next machining process.

* * * * *